C. L. THOMPSON.
BRAKE MECHANISM FOR TRUCKS.
APPLICATION FILED AUG. 31, 1920.
1,389,917.
Patented Sept. 6, 1921.
2 SHEETS—SHEET 2.
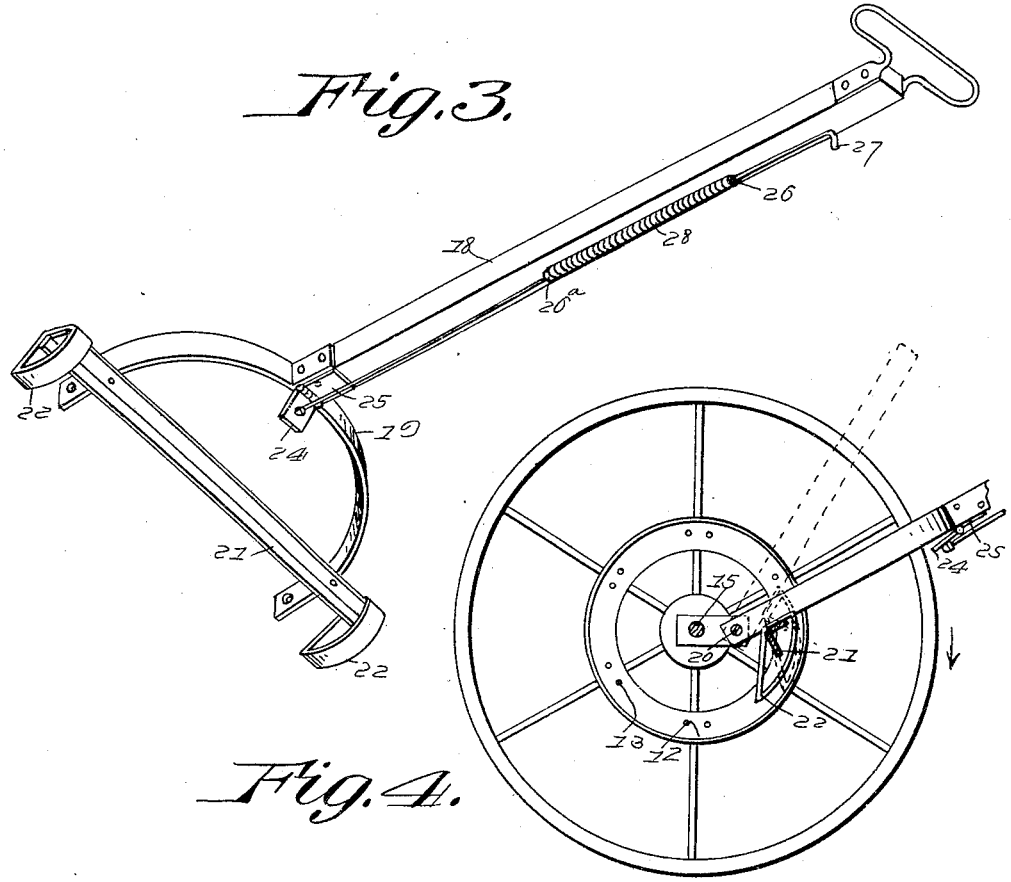

UNITED STATES PATENT OFFICE.

CARL LEWIS THOMPSON, OF NEW LISBON, WISCONSIN, ASSIGNOR OF ONE-HALF TO CHARLES A. LEICHT, SR., OF NEW LISBON, WISCONSIN.

BRAKE MECHANISM FOR TRUCKS.

1,389,917.   Specification of Letters Patent.   Patented Sept. 6, 1921.

Application filed August 31, 1920. Serial No. 407,258.

*To all whom it may concern:*

Be it known that I, CARL L. THOMPSON, a citizen of the United States of America, and resident of New Lisbon, in the county of Juneau and State of Wisconsin, have invented certain new and useful Improvements in Brake Mechanism for Trucks, of which the following is a specification.

This invention relates to trucks such as are employed for moving baggage, express matter and the like, and has for its object the provision of novel means for holding the truck against movement or for arresting its movement by a braking action, the said invention having for its object the provision of novel means whereby the oscillatory motion of the tongue is communicated to the brake shoes for applying a brake.

A further object of this invention is to produce a truck having a rack or element with relation to which the tongue oscillates, and interlocking or interengaging means for holding the tongue in different positions of adjustment.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Fig. 3 illustrates a perspective view of the tongue and brake shoe;

Fig. 4 illustrates an enlarged detailed view of the wheel and braking mechanism applied thereto, and Fig. 5 illustrates a perspective view of the brake drum.

Figure 1:
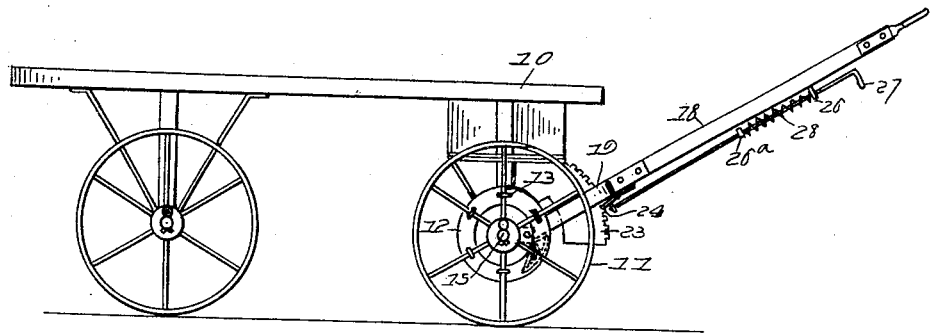
Figure 1 illustrates a view in elevation of a truck having the brake mechanism embodying the invention applied thereto.
Figure 2:
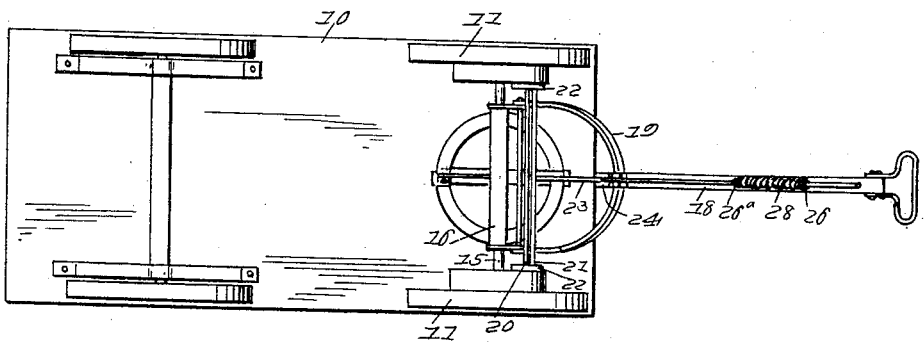
Fig. 2 illustrates an underneath plan view thereof.

In these drawings 10 denotes the truck, the front wheels 11 of which each has a brake drum 12 secured to it by means of U-bolts 13 applied to apertures 14 of the flange of the drum, the said U-bolts embracing spokes of the wheel 11, the wheel of course being mounted on the usual spindles 15 on the axle 16.

The tongue 18 has a yoke 19 with its ends mounted on a pivot 20 of the axle so that by these means, the tongue is oscillatable with respect to the brake drum. A bar or brake beam 21 is attached to the yoke in any appropriate way, and the brake beam carries the brake shoes 22, one of which is at each end, and of course, the brake beam must be of such length as to span the space between the brake drums so that the brake shoes are in operative relation to the brake drums and may move into and out of engagement therewith by the oscillation of the tongue.

A toothed segment or rack 23 is carried by the front portion of the truck and it lies within the yoke 19 in an arc parallel to that described by the inner end of the tongue so that it may engage a detent 24 carried by the tongue to hold the tongue at different positions of adjustment, and particularly in its elevated position wherein the brake shoes are retained in engagement with the brake drum to hold the truck against movement while being loaded and unloaded.

In the present embodiment of the invention, the detent comprises a member which is hinged to a plate 25 secured to the tongue, and a rod is slidably mounted in guides such as 26 under the tongue, terminating in a handle 27 by which the said rod may be moved. The inner end of the rod is connected to the detent so that it may be manipulated by the rod. The rod is held normally under tension of the spring 28 coiled around the rod between the guides 26, and a collar 26ᵃ may be secured on the rod in any appropriate way so that the spring normally holds the detent in engagement with the toothed rack.

The device can be constructed inexpensively by reason of the fact that the brake shoe is angle iron and the other parts thereof are of metal easily shaped and mounted or assembled, and the device as a whole is comparatively inexpensive and highly efficient.

I claim:

1. In a brake for baggage trucks, drums, secured to the front wheels of the truck, a tongue mounted to oscillate with relation to the drums, a brake beam mounted on the tongue structure near its inner end, shoes carried by the brake beam engaging the said drums, and means for holding the tongue at different positions of adjustment.

2. In a baggage truck having traction wheels, brake drums secured thereon, a tongue having a yoke in its inner end, the said yoke being pivotally mounted with relation to the drums and in operative relation therewith, a brake beam connecting the sections of the yoke and carried thereby, brake shoes on the said brake beam which move into and out of operative relation to the brake drums by the oscillation of the tongue, and means for holding the tongue at different positions of adjustment.

3. In a baggage truck having traction wheels, brake drums secured thereon, a tongue having a yoke in its inner end, the said yoke being pivotally mounted with relation to the drums and in operative relation therewith, a brake beam connecting the sections of the yoke and carried thereby, brake shoes on the said brake beam which move into and out of operative relation to the brake drums by the oscillation of the tongue, a toothed segment supported by the truck and projecting into the space embraced by the yoke, a detent carried by the tongue adapted to engage the toothed segment for holding the tongue at different positions of adjustment, and means for urging the detent into engagement with the toothed segment and for moving it out of engagement with the toothed segment.

4. In a baggage truck having traction wheels, brake drums secured thereon, a tongue having a yoke in its inner end, the said yoke being pivotally mounted with relation to the drums and in operative relation therewith, a brake beam connecting the sections of the yoke and carried thereby, brake shoes on the said brake beam which move into and out of operative relation to the brake drums by the oscillation of the tongue, a toothed segment supported by the truck and projecting into the space embraced by the yoke, a detent carried by the tongue adapted to engage the toothed segment for holding the tongue at different positions of adjustment, a rod for moving the detent, means for slidably mounting the rod under the tongue, and means for exerting pressure on the rod in one direction.

CARL LEWIS THOMPSON.